United States Patent
Sasaki et al.

(10) Patent No.: US 11,159,352 B2
(45) Date of Patent: Oct. 26, 2021

(54) ADAPTIVE EQUALIZER, OPTICAL RECEIVER, AND OPTICAL TRANSMISSION SYSTEM

(71) Applicant: FUJITSU LIMITED, Kawasaki (JP)

(72) Inventors: Daisuke Sasaki, Yokohama (JP); Hisao Nakashima, Kawasaki (JP); Nobukazu Koizumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/066,511

(22) Filed: Oct. 9, 2020

(65) Prior Publication Data
US 2021/0160108 A1    May 27, 2021

(30) Foreign Application Priority Data

Nov. 21, 2019  (JP) .............................. JP2019-210775

(51) Int. Cl.
*H04B 10/50* (2013.01)
*H04L 25/03* (2006.01)
*H04B 10/60* (2013.01)

(52) U.S. Cl.
CPC ....... *H04L 25/03885* (2013.01); *H04B 10/50* (2013.01); *H04B 10/60* (2013.01)

(58) Field of Classification Search
CPC .... H04B 10/50; H04B 10/60; H04B 10/6162; H04B 10/6164
See application file for complete search history.

(56) References Cited

U.S. PATENT DOCUMENTS

| | | | |
|---|---|---|---|
| 2007/0201544 A1* | 8/2007 | Zhu | H04L 25/03057 375/229 |
| 2009/0034556 A1* | 2/2009 | Song | H04N 21/6437 370/471 |
| 2011/0007789 A1* | 1/2011 | Garmany | H04L 25/03159 375/224 |
| 2013/0111307 A1* | 5/2013 | Zhou | H04L 25/03057 714/799 |
| 2014/0079408 A1* | 3/2014 | Yan | H04L 25/03006 398/152 |
| 2017/0012803 A1* | 1/2017 | Sasaki | H04B 10/6162 |

FOREIGN PATENT DOCUMENTS

JP    2014-060708 A    4/2014

* cited by examiner

*Primary Examiner* — Dzung D Tran
(74) *Attorney, Agent, or Firm* — Fujitsu Patent Center

(57) ABSTRACT

An adaptive equalizer includes a sample buffer that temporarily stores data obtained by fractional sampling at a sampling rate that is larger than one time and smaller than two times a symbol rate; and a processor coupled to the sample buffer and configured to: specify position of a training sequence in the data based on a correlation value between a first set of (f×T) samples and a second set of (f×T) samples following the first set of samples, assuming that the sampling rate is f, and a symbol length of a code pattern included in the training sequence inserted in the data is T, and calculate an initial value of a tap coefficient set to a tap of an adaptive equalization filter based on the specified training sequence, wherein the symbol length is set to be changeable so that f×T is an integer.

11 Claims, 11 Drawing Sheets

FIG. 6

| FRACTIONAL SAMPLING RATE f | SYMBOL LENGTH T OF TS PATTERNS |
|---|---|
| 1.5 TIMES (= 3/2) | 2,4,6,8,⋯ |
| 1.33 TIMES (= 4/3) | 3,6,9,12,⋯ |
| 1.25 TIMES (= 5/4) | 4,8,12,16,⋯ |

(12) United States Patent

ADAPTIVE EQUALIZER, OPTICAL RECEIVER, AND OPTICAL TRANSMISSION SYSTEM

CROSS-REFERENCE TO RELATED APPLICATION

This application is based upon and claims the benefit of priority of the prior Japanese Patent Application No. 2019-210775, filed on Nov. 21, 2019, the entire contents of which are incorporated herein by reference.

FIELD

The embodiment discussed herein is related to an adaptive equalizer, an optical receiver using the same, and an optical transmission system.

BACKGROUND

In the digital coherent optical transmission technology, received light in which data is superimposed on a phase of an optical carrier wave is subjected to analog/digital conversion (hereinafter, referred to as "A/D conversion"), waveform distortion is compensated for by digital signal processing, and transmission data is restored from a received signal. An adaptive equalization unit of a digital signal processor (hereinafter, referred to as "DSP") obtains a reverse characteristic (tap coefficient) of a transmission line and compensates for distortion of a transmission waveform.

In order to avoid aliasing and recover the correct waveform, oversampling is normally performed at two times a symbol rate. In this case, the number of taps of an equalizer is increased two times, and the processing amount is also increased. Due to the increase in communication traffic in recent years, reduction in power consumption in optical networks is desired, and reduction in power consumption and circuit scale is also requested in digital signal processing.

In response to this request, there has been considered fractional sampling in which sampling is performed at a fractional value larger than one time and smaller than two times the symbol rate. In fractional sampling, the number of times of sampling is smaller than that of two-times oversampling, the number of taps is reduced, the equivalent circuit is miniaturized, and power consumption may be reduced.

A characteristic of a transmission line is determined by installation conditions of the transmission line and continues to change during communication. The adaptive equalizer updates the tap coefficient following the change of the transmission line characteristic during communication, and compensates for the influence of the change of the transmission line characteristics on the input digital data. In addition to the adaptive update of the tap coefficient during communication, an initial value of the tap coefficient is determined based on channel estimation or the like at the time of starting or restarting the optical receiver, and the initial value is set to each tap of the adaptive equalizer.

A method of determining an equalizer initial tap coefficient closer to an optimum value by using a training sequence provided in a transmission signal has been proposed. As related art, for example, Japanese Laid-open Patent Publication No. 2014-60708 and the like are disclosed.

SUMMARY

According to an aspect of the embodiments, An adaptive equalizer includes a sample buffer that temporarily stores data obtained by fractional sampling at a sampling rate that is larger than one time and smaller than two times a symbol rate; and a processor coupled to the sample buffer and configured to: specify position of a training sequence in the data based on a correlation value between a first set of (f×T) samples and a second set of (f×T) samples following the first set of samples, assuming that the sampling rate is f, and a symbol length of a code pattern included in the training sequence inserted in the data is T, and calculate an initial value of a tap coefficient set to a tap of an adaptive equalization filter based on the specified training sequence, wherein the symbol length is set to be changeable so that f×T is an integer.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an example of correspondence information describing the correspondence between a sampling rate f and a symbol length T;

DESCRIPTION OF EMBODIMENTS

In a known method of determining a tap coefficient initial value, a waveform of a training sequence is described using a discrete signal having a sampling rate based on the Nyquist sampling theorem.

The inventors have found that, when fractional sampling is introduced, the approach of determining a tap coefficient initial value from a training sequence of related art may not work correctly.

In view of the above, it is desirable to provide an adaptive equalization technology capable of setting an appropriate tap coefficient initial value using a training sequence when fractional sampling is performed.

Figure 1:
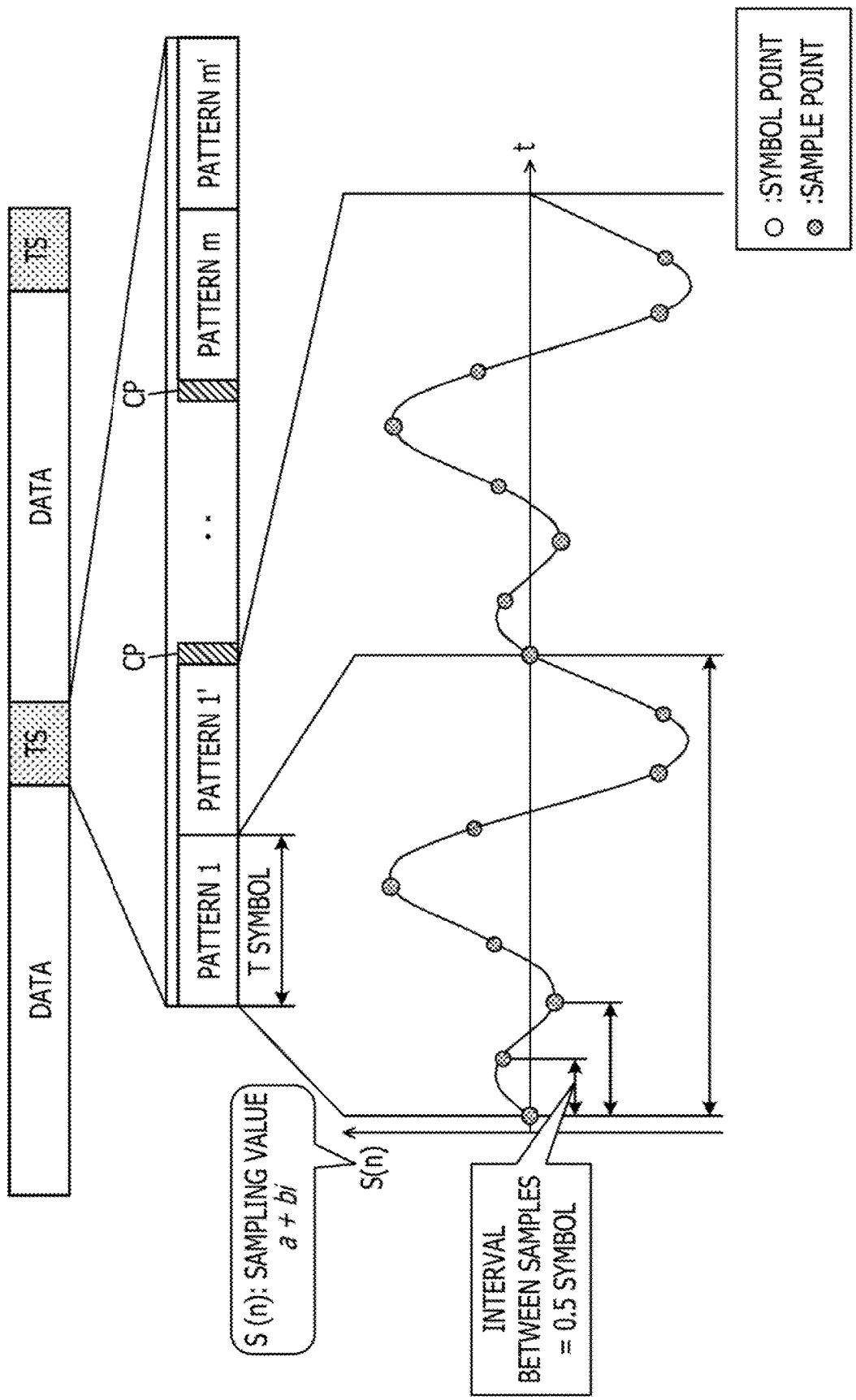
FIG. 1 is a diagram illustrating two-times oversampling of a training sequence.

FIG. 1 illustrates a training sequence contained in a received signal and sampling of the training sequence. A general two-times oversampling is illustrated. On the transmitting side, a training sequence TS is inserted between pieces of data in advance. The data portion is also referred to as a payload. When a system or an optical transceiver is started up, test data may be placed in the payload. Padding may be performed with zeros before and after the training sequence TS.

The training sequence TS includes m (m is a natural number) pattern pairs. One pattern pair includes two identical code patterns (hereinafter, simply referred to as "pattern(s)"), and different pattern pairs have different patterns. For example, pattern 1 and pattern 1' have the same pattern, and pattern m and pattern m' have the same pattern, but the pattern pairs have different patterns. Adjacent pattern pairs are separated by a cyclic prefix (CP).

The optical receiver does not know which part of the sequentially digitally sampled and buffered sample values corresponds to a symbol of the training sequence TS. Therefore, by utilizing the fact that each pattern pair includes two same patterns, the buffer selection position at which the correlation between two consecutive patterns is maximized is determined as the start position of the training sequence TS. Once the start position of the training sequence TS is known, the length of the training sequence TS is known, so the position of the training sequence in the data is known and channel estimation may be performed. The process of specifying the start position of the training sequence TS is referred to as "TS synchronization".

When the symbol length of each pattern included in the training sequence TS is T and the sampling rate is f, for each set of (f×T) samples, a correlation value with the next set of (f×T) samples is calculated. In the example of FIG. 1, T=4 and f=2. Since the sampling rate is two times, an interval between samples is 0.5 symbol, and 2×4, for example, eight samples are obtained in each pattern. A sample value S (n) of each sample point is an amplitude or an intensity of a complex signal represented by a real part a and an imaginary part bi.

As in FIG. 1, when the value of f×T is an integer, the positions of samples and the number of sample points are the same between two consecutive patterns, and TS synchronization may be performed from the degree of correlation between the patterns.

Figure 2:
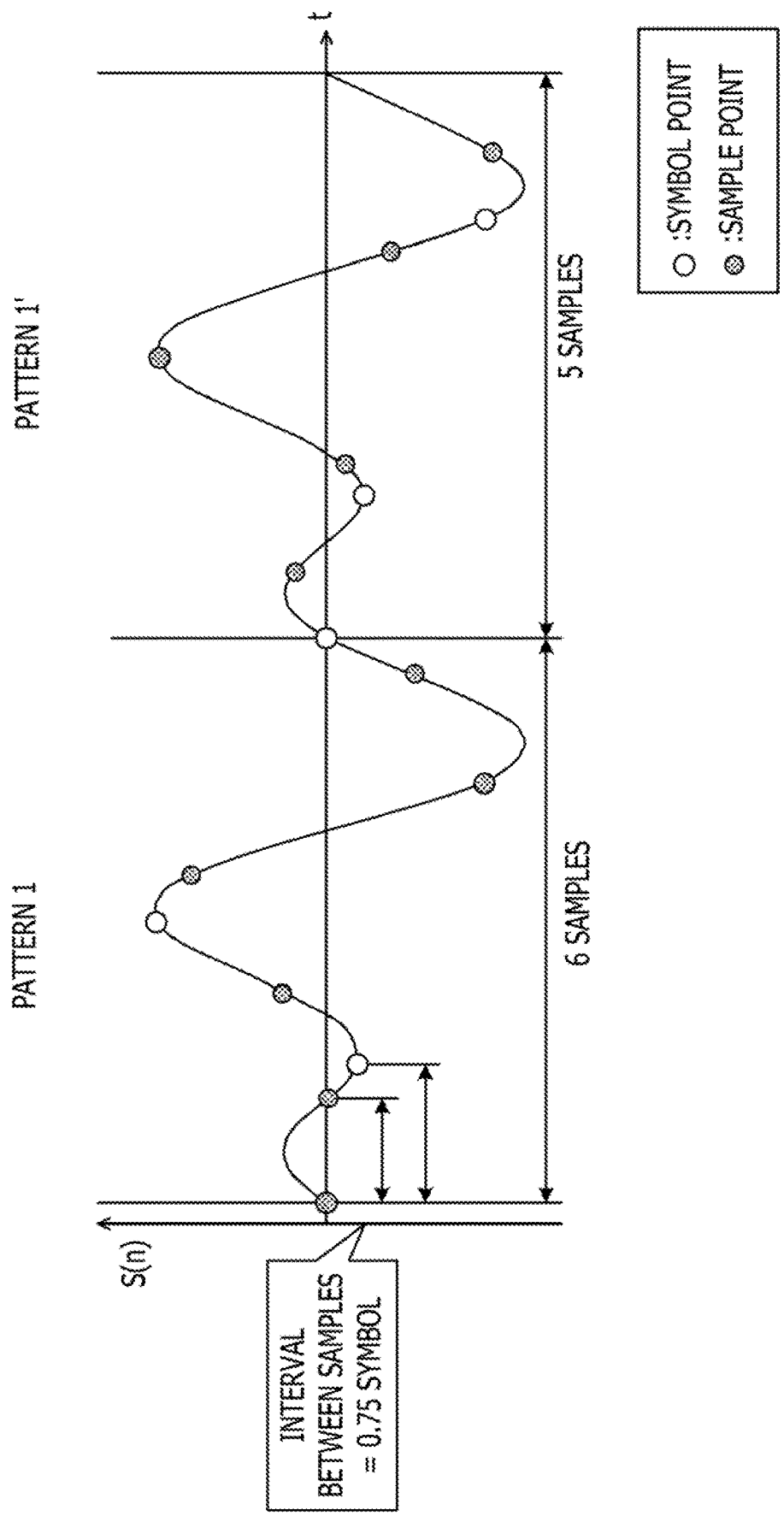
FIG. 2 is a diagram explaining a problem occurring in fractional sampling of a training sequence.

FIG. 2 illustrates an example of fractional sampling. The symbol length T of each pattern is T=4 as in FIG. 1, and the sampling rate f is 4/3. In this case, digital sampling is performed at a frequency of 1.33 . . . times the symbol rate, and pieces of sample data are obtained at an interval of 0.75 symbol. The value of f×T is 16/3, which is not an integer value.

Consecutive patterns 1 and 1' have different sample points and/or different numbers of samples. In pattern 1, six sample points are obtained, while in pattern 1', five sample points are obtained at different time positions from pattern 1. A correlation value may not be correctly calculated between pattern 1 and pattern 1', and an error occurs in searching for a buffer selection position by TS synchronization.

Figure 3:
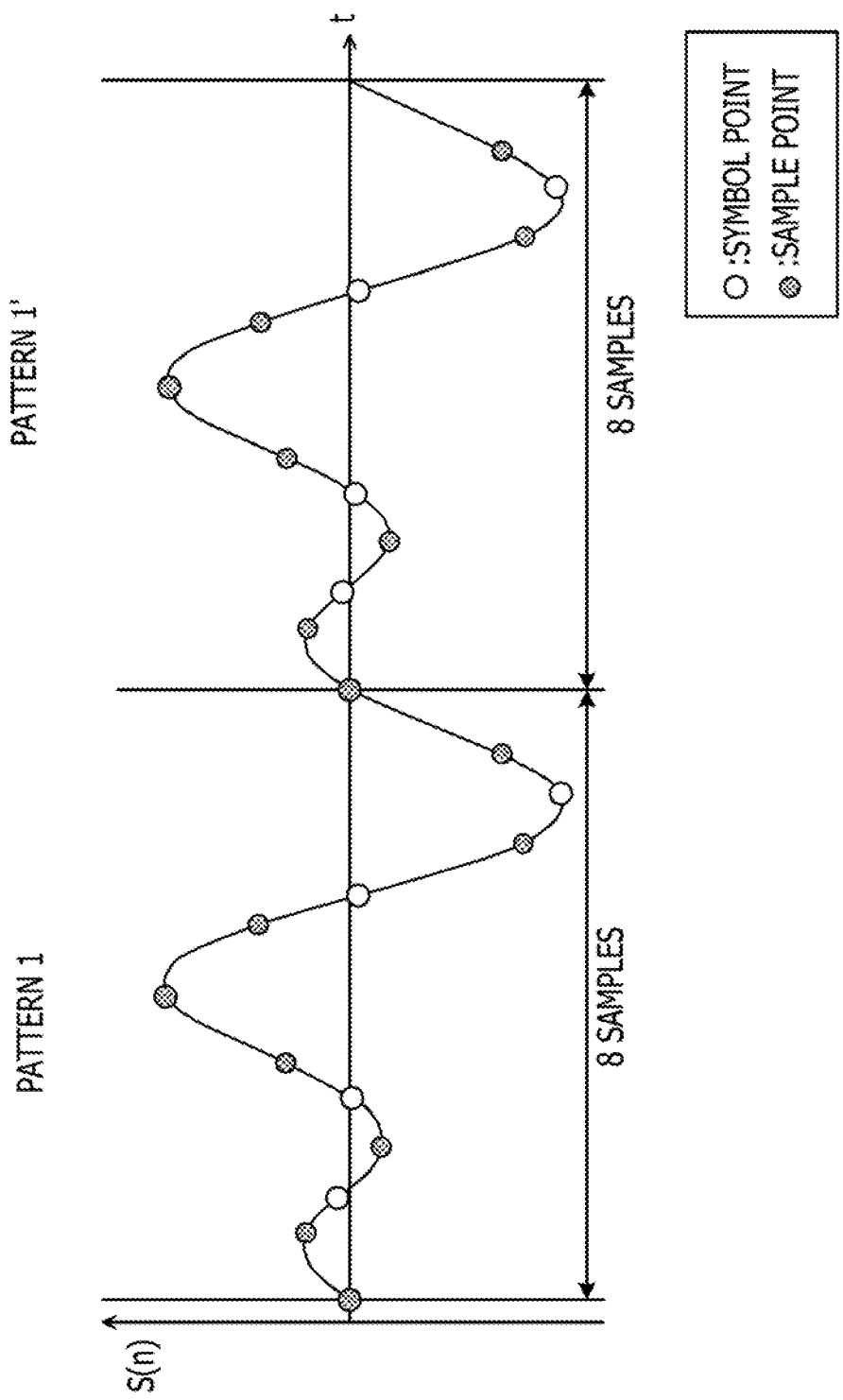
FIG. 3 is a diagram explaining the basic operation of an embodiment.

FIG. 3 illustrates an approach or a configuration of the embodiment for solving the problem arising in FIG. 2. In the embodiment when the value of f×T is not an integer, the symbol length T of each pattern constituting the training sequence TS is changed to make f×T an integer.

As an example, when the sampling rate f is 4/3, the symbol length of each pattern included in the training sequence TS is changed from T=4 to T=6. Accordingly, f×T=24/3=8, and eight sample points are secured at the same positions in each pattern. An integer value may also be obtained by changing to T=3, but the number of sample points in one pattern is insufficient, and the accuracy of correlation operation between two consecutive patterns may decrease.

On the other hand, if the value of T is too large, an amount of data to be transmitted may decrease when the total frame length of the data and the training sequence TS is fixed.

It is desirable to select the value of T such that the accuracy of correlation operation is maintained within a range in which the influence on the data transmission amount may be minimized.

Figure 4:
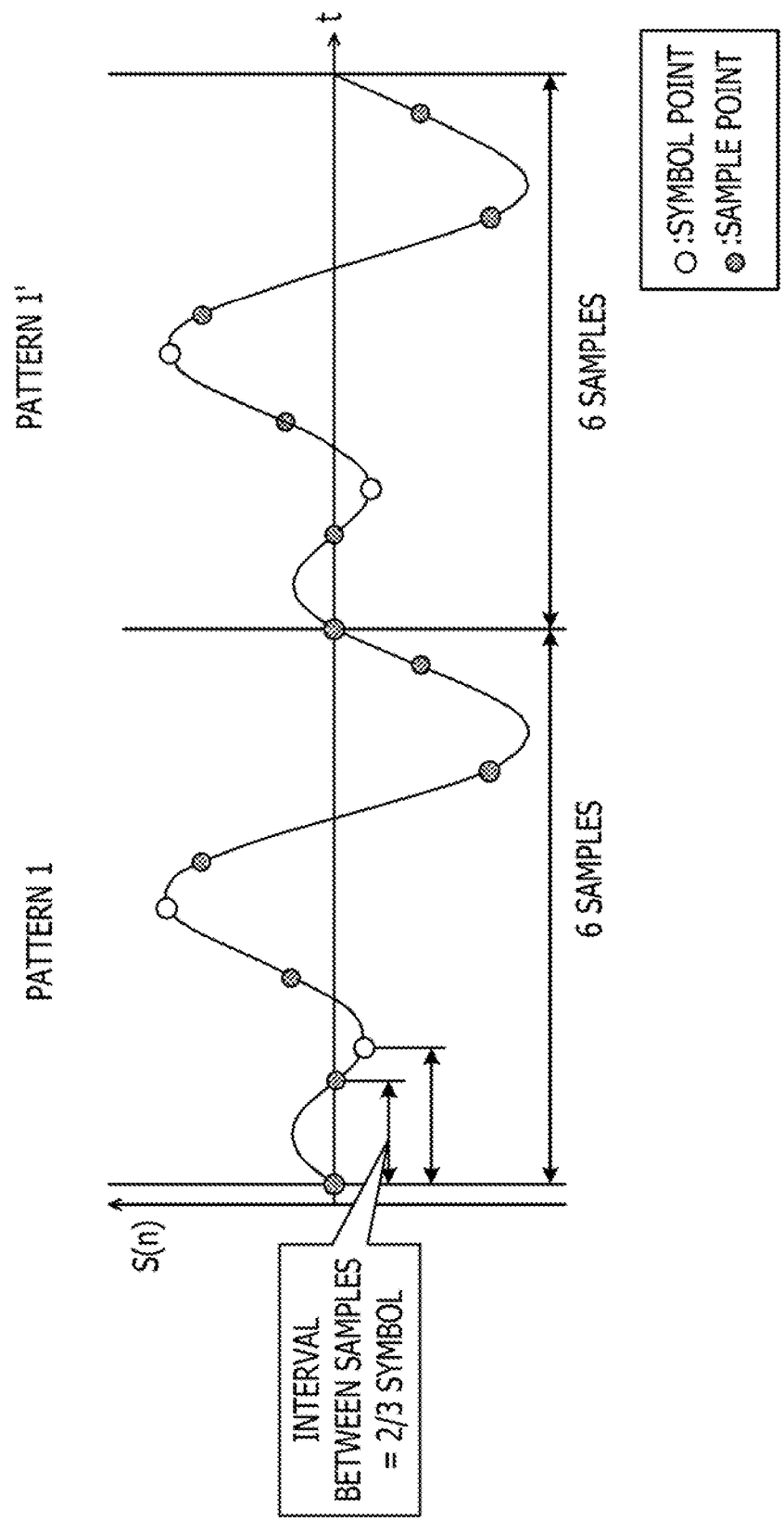
FIG. 4 is a diagram illustrating an example in which a symbol pattern, for example, a symbol length does not have to be changed.
Figure 5:
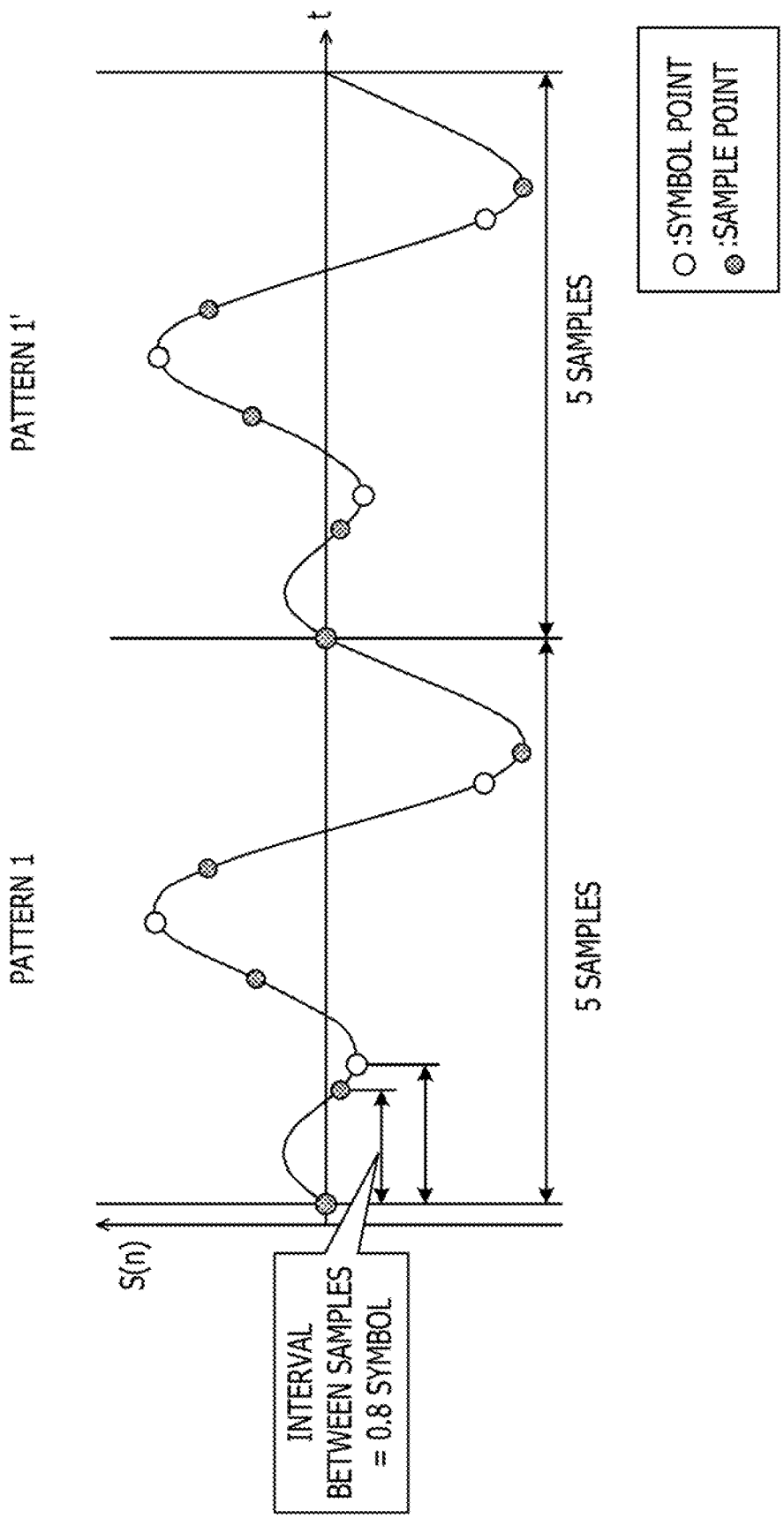
FIG. 5 is a diagram illustrating an example in which a symbol pattern, for example, a symbol length does not have to be changed.

FIG. 4 and FIG. 5 illustrate examples in which the symbol pattern, for example, the symbol length T does not have to be changed. In FIG. 4, the sampling rate f is 3/2, and fractional sampling of 1.5 times the symbol rate is performed. The symbol length T of each pattern included in the training sequence TS is 4 symbols (T=4). f×T=4×3/2=6, and six pieces of sample data are obtained at the same sample positions in both of the adjacent patterns 1 and 1'. In this case, the symbol length T does not have to be changed.

In FIG. 5, the sampling rate f is 5/4, and fractional sampling of 1.25 times the symbol rate is performed. The symbol length T of each pattern included in the training sequence TS is 4 symbols (T=4). f×T=4×5/4=5, and five pieces of sample data are obtained at the same sample positions in both of the adjacent patterns 1 and 1'. Also in this case, the symbol length T does not have to be changed.

FIG. 6 is an example of correspondence information 5 describing the correspondence between the sampling rate f and the symbol length T. The correspondence information 5 may be held on the network side, and an appropriate symbol length T may be selected according to the setting of an analog-to-digital converter (ADC) of the optical receiver and notified to the optical receiver and an optical transmitter. Alternatively, at least one of the optical receiver and the optical transmitter may hold the correspondence information 5 and select an appropriate symbol length according to the setting of the ADC of the optical receiver.

The symbol value T that makes f×T an integer is n times (n is a natural number) the denominator of the sampling rate f that is a fractional value.

When the sampling rate f is 3/2, the symbol length T is 2, 4, 6, . . . .

When the sampling rate f is 4/3, the symbol length T is 3, 6, 9, . . . .

When the sampling rate f is 5/4, the symbol length T is 4, 8, 12, . . . . Similarly, when the sampling rate f is 6/5 (fractional sampling of 1.2 times), the symbol length T is 5, 10, 15, . . . .

As described above, if the symbol length T is too large, the length of the entire training sequence increases and the data rate may decrease. Therefore, it is desirable to select the value of T within a range that does not affect the data rate or within an allowable range.

Figure 7:
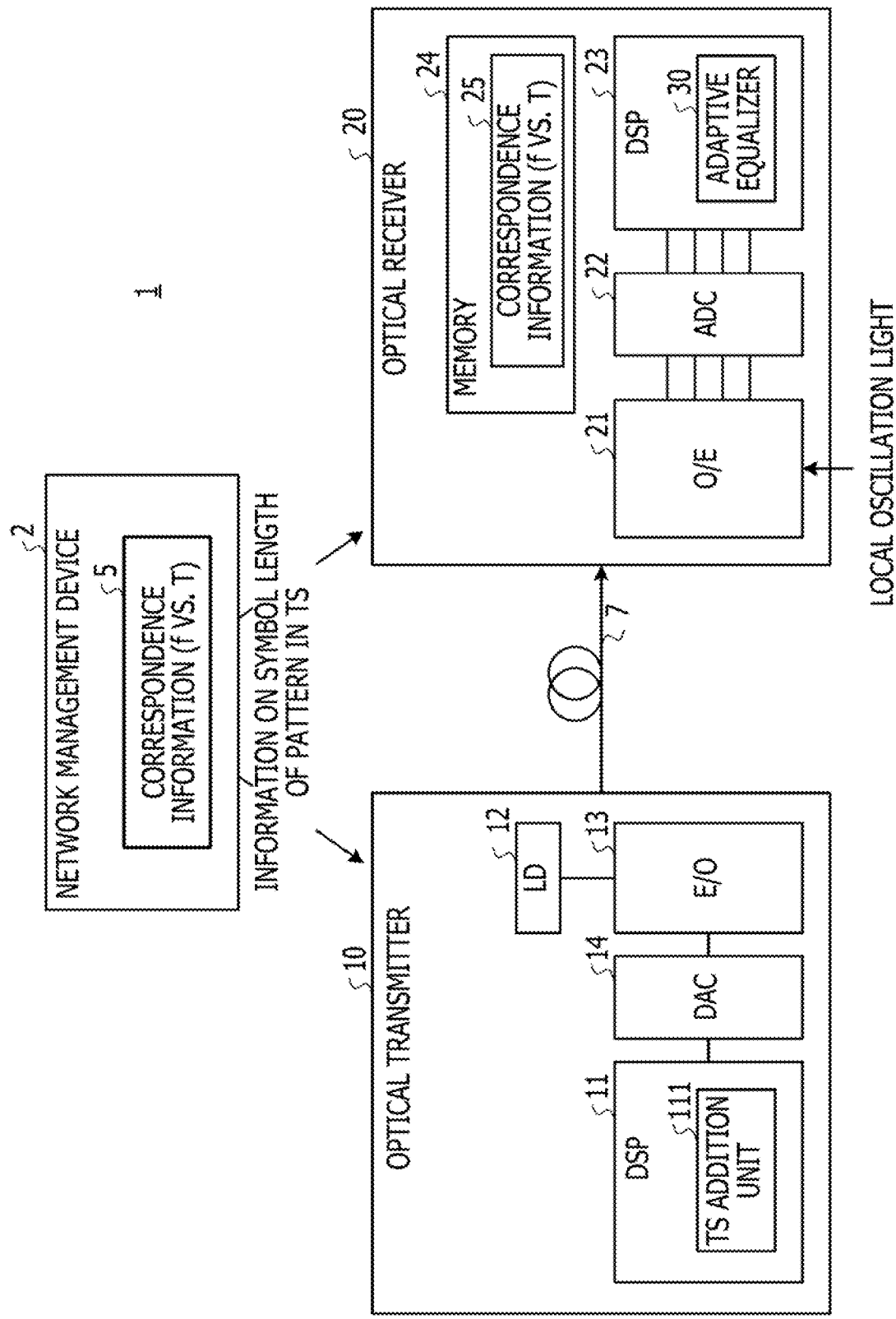
FIG. 7 is a schematic diagram of an optical transmission system.

FIG. 7 is a schematic diagram of an optical transmission system 1 according to the embodiment. The optical transmission system 1 includes a network management device 2, an optical transmitter 10, and an optical receiver 20. The optical transmitter 10 and the optical receiver 20 are coupled to each other by an optical transmission line 7, and are coupled to the network management device 2 by a monitoring network.

In FIG. 7, for convenience, an example in which an optical signal into which the training sequence TS is inserted is transmitted from the optical transmitter 10 to the optical receiver 20 is drawn. In many cases, an optical communication device has both a transmission function and a reception function, and is configured as an optical transceiver.

The optical transmitter 10 includes a DSP 11, a light source (denoted as "LD" in the figure) 12, a digital-to-analog converter 14 (hereinafter, referred to as "DAC 14"), and an electrical-to-optical conversion circuit (denoted as "E/O" in the figure) 13. The DSP 11 includes a T addition unit 111, and outputs digital data in which a known training sequence TS is inserted into user data (see FIG. 1). The DAC 14 converts digital data output from the DSP 11 into an analog electrical signal. The electrical-to-optical conversion circuit 13 is a transmission front-end circuit, modulates light from the light source 12 based on a data signal input from the DSP 11 via the DAC 14, and outputs a modulated optical signal to the optical transmission line 7.

The optical receiver 20 includes an optical-to-electrical conversion circuit (denoted by "O/E" in the figure) 21 that converts an optical signal received from the optical transmission line 7 into an electrical signal, an ADC 22 that converts an analog electrical signal output from the optical-to-electrical conversion circuit 21 into a digital signal, a DSP 23, and a memory 24.

As an example, the optical-to-electrical conversion circuit 21 uses local oscillation light to perform homodyne detection utilizing phase and polarization diversity. An X-polarized wave component (X-I component) detected in phase with the local oscillation light, a component (X-Q component) detected with a phase difference of 90°, a Y-polarized wave component (Y-I component) detected in phase with the local oscillation light, and a component (Y-Q component) detected with a phase difference of 90° are output from the optical-to-electrical conversion circuit 21.

The ADC 22 digitally samples the analog electrical signal at a sampling rate f that is greater than one time and less than two times the symbol rate. The digitally sampled data is sequentially input to the DSP 23 and subjected to adaptive equalization processing in an adaptive equalizer 30.

The adaptive equalizer 30 compensates for distortion due to polarization dispersion by following polarization change of the optical transmission line 7 during communication and multiplying each separated polarized wave by a tap coefficient, which is the reverse characteristic of the transmission line.

Prior to adaptive equalization during communication, an initial value is set to a tap coefficient of each filter of the adaptive equalizer 30. In order to set an appropriate coefficient initial value to the adaptive equalizer 30, the start position of the training sequence TS in the digitally sampled received data is correctly specified, and the characteristic of a transmission line is estimated from the training sequence TS. In the embodiment, even when fractional sampling is adopted, since the symbol length T of the TS pattern is adjusted so that f×T is an integer, TS synchronization may be appropriately performed.

As illustrated in FIGS. 2 and 3, when the symbol length T is changed from T=4 to T=6 in order to make f×T an integer value in fractional sampling, the number of sample points of each pattern increases from six samples to eight samples. The number of taps of each filter of the adaptive equalizer 30 is determined by the number of samples. Even if the symbol length T is increased to 1.5 times, the number of samples is the same as the number of samples at the time of two-times oversampling of related art, and it is possible to use a filter circuit of related art.

The network management device 2 may include correspondence information 5 describing a relationship between the sampling rate f and the symbol length T of the pattern included in the training sequence TS. When at least one of the optical transmitter 10 and the optical receiver 20 is newly installed or restarted, or when the sampling rate f of the ADC 22 of the optical receiver 20 is changed, or in other cases, the network management device 2 sets the symbol length T corresponding to the fractional sampling rate in the optical transmitter 10 and the optical receiver 20. The symbol length T may be selected from the correspondence information 5 such that f×T is an integer.

The optical receiver 20 may include correspondence information 25 together with the network management device 2 including the correspondence information 5 or instead of the network management device 2 including the correspondence information 5. The system may be designed so that a desired symbol length T may be set to the DSP 23 according to the sampling rate of the ADC 22 incorporated in the optical receiver 20. The system may also be designed so that the sampling rate of the ADC 22 and the symbol length T may be changed in accordance with a customers request.

In this case, the optical receiver 20 may notify the optical transmitter 10 of the symbol length T via the monitoring network. The optical transmitter 10 may include code patterns with a plurality of types symbol length T in advance.

Figure 8:
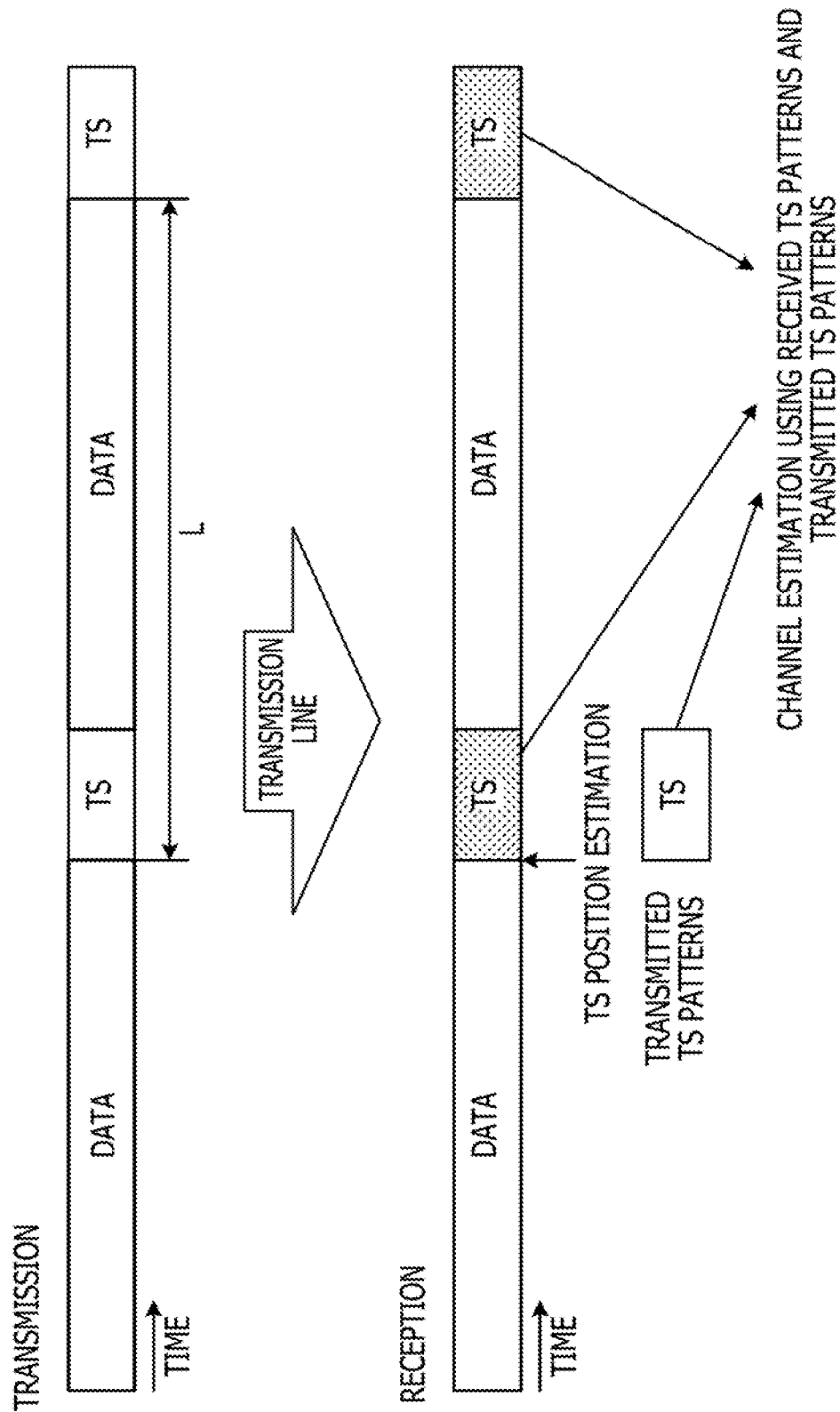
FIG. 8 is a schematic diagram of transmission and reception of pieces of data between which a training sequence is inserted.

FIG. 8 is a diagram explaining determination of a tap coefficient initial value of the adaptive equalizer 30 using the training sequence TS. On the transmitting side, a known training sequence TS is inserted between pieces of data in advance. The training sequences TS to be inserted are all the same, and each training sequence includes m pattern pairs. The total length of data and the training sequence TS, for example, a frame length 1, is fixed. The symbol length T of each pattern of the pattern pairs included in each training sequence is set in advance such that f×T is an integer when the fractional sampling rate on the receiving side is f.

On the receiving side, optical signals are sequentially received from the optical signal transmitted earlier in time. An optical signal including data and the training sequence TS is converted into an analog electrical signal, and the analog electrical signal is digitally sampled. Even when the sampling rate f is a fractional value, since the symbol length T is adjusted in advance, the position of the training sequence TS in the data is specified by appropriately performing TS synchronization.

The training sequence TS specified on the receiving side is affected by the change of the characteristics of the optical transmission line 7. The adaptive equalizer 30 estimates the characteristic of the optical transmission line 7 based on the training sequence TS received from the optical transmission line 7 and the known training sequence inserted on the transmission side, and sets an initial value of a tap coefficient of a filter. For example, channel estimation is performed by the minimum mean square error (MMSE) method or the like that minimizes a square error, and a coefficient initial value representing the reverse characteristic of the transfer function of the optical transmission line 7 is calculated.

Figure 9:
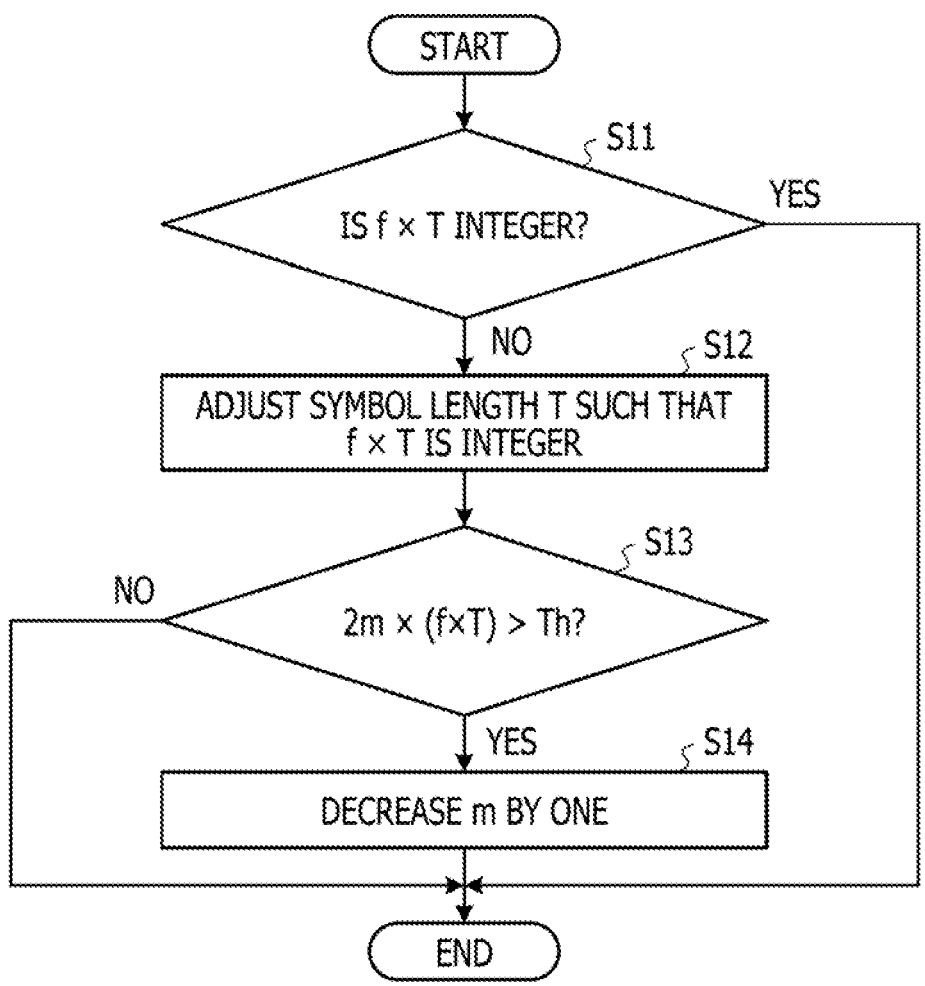
FIG. 9 is a flowchart of a symbol length design method.

FIG. 9 is a flowchart of the symbol length designing method. This control flow may be performed by the network management device 2 or by the DSP 23 of the optical receiver 20.

First, it is determined whether the product of the sampling rate f of fractional sampling and the symbol length T of each pattern included in the training sequence TS is an integer (S11). If f×T is an integer, the symbol length T does not have to be changed, and the process ends.

If f×T is not an integer, the symbol length T is adjusted so that f×T becomes an integer. As in FIG. 2, when the sampling rate f is 4/3 and a fractional sampling of 1.33 . . . times is performed, T is changed from T=4 to T=6, for example, in order to secure a certain number of sample points in each pattern. In this case, the symbol length T of one pattern is 1.5 times the original symbol length.

If m pattern pairs are included in the training sequence TS, the total length of the training sequence TS is 2 m×(f×T) when two symbols are added to each pattern. If the symbol length of each pattern is multiplied by 1.5, the total length of the training sequence is also multiplied by 1.5.

If the frame length L of one frame including the training sequence TS and a data block is fixed (see FIG. 8), the data length is shortened by changing the symbol length T, and the transmission rate may be lowered depending on the value of T. Therefore, when the total length of the training sequence TS exceeds an allowable range by changing the symbol length T, the number of pattern pairs included in the training sequence TS is reduced.

In step S13, it is determined whether or not 2 m×(f×T) is larger than a threshold value Th with the changed value of T, and if it exceeds the threshold value Th, the number m of pattern pairs is decreased by one (S14), and the process is terminated. Even if the value of the number m of pattern pairs is decreased by one, a sufficient number of sample points may be obtained for each pattern, so that the autocorrelation for TS synchronization and the sum thereof may be accurately calculated. As a result, by adopting fractional sampling, the processing amount and power consumption of the DSP 23 may be reduced.

Figure 10:
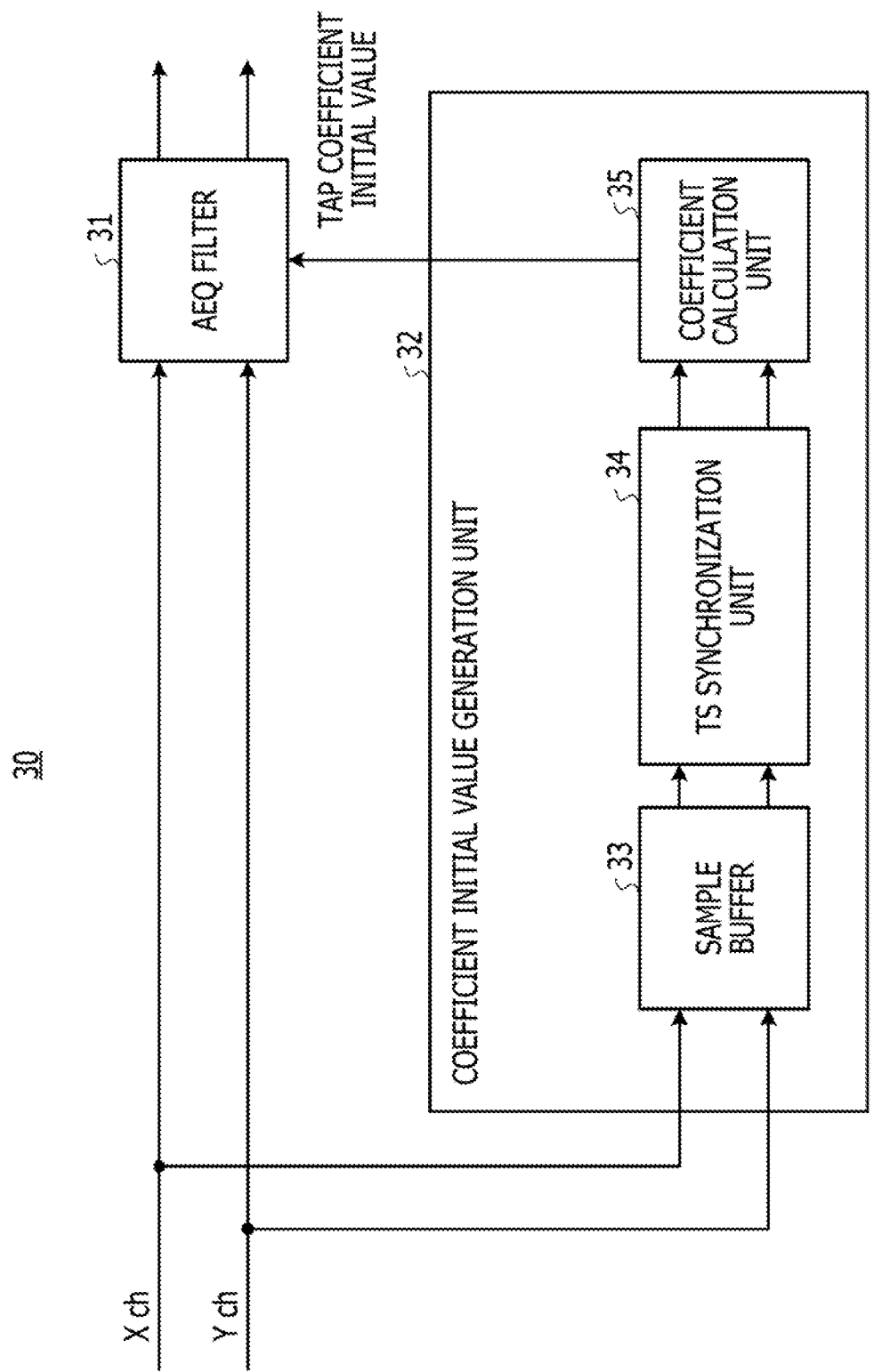
FIG. 10 is a schematic diagram of an adaptive equalizer.

FIG. 10 is a schematic diagram of the adaptive equalizer 30. The adaptive equalizer 30 includes an adaptive equalization (AEQ) filter 31 and a coefficient initial value generation unit 32. A signal input to the DSP 23 and separated into an X channel and a Y channel is input to the AEQ filter 31 during communication and subjected to adaptive equalization processing. The tap coefficient of each filter of the AEQ filter 31 is updated in accordance with the transmission line characteristic in order to follow the change of the characteristics of the optical transmission line 7 during communication.

On the other hand, at the time of start, restart, or the like of the system, the coefficient initial value generation unit 32 determines the initial value of the tap coefficient based on the input training sequence T prior to data communication.

The coefficient initial value generation unit 32 includes a sample buffer 33, a TS synchronization unit 34, and a coefficient calculation unit 35. The sample buffer 33 sequentially accumulates sample data of each channel subjected to fractional sampling.

The TS synchronization unit 34 reads sample data of the number of samples that may be subjected to TS synchronization process from a certain position in the sample buffer 33. The read position in this case is not necessarily the start position of the training sequence TS. For this reason, the buffer selection area is changed while shifting by one sample at a time, and the read position at which the correlation between two consecutive patterns is the highest is specified as the start position of the training sequence.

Figure 11:
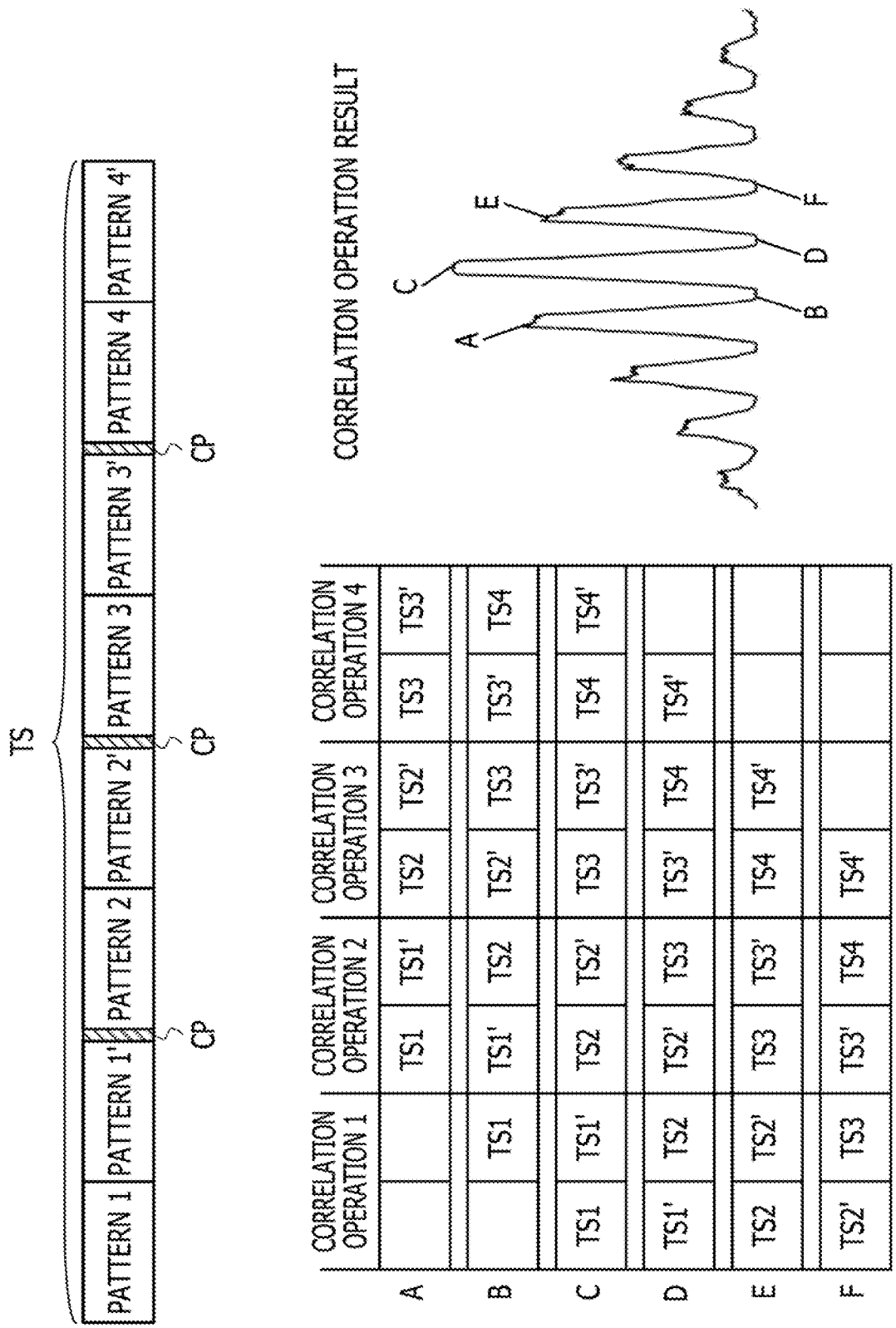
FIG. 11 is a diagram explaining correlation operation using a training sequence.

FIG. 11 is a diagram explaining calculation of correlation values for TS synchronization. Strictly speaking, not only each pattern pair included in the training sequence TS but also cyclic prefixes CP separating the pattern pairs are digitally sampled, but for the sake of simplifying explanation, explanation will be given based on a state in which there is no cyclic prefixes CP.

The TS synchronization unit 34 calculates, for each set of (f×T) samples among pieces of data read from an arbitrary position of the sample buffer 33, an autocorrelation value with the next set of (f×T) samples. Even if the sampling rate f is a fractional value larger than 1 and smaller than 2, the value of T is adjusted in advance so that (f×T) is an integer. The same sample position and the same number of sample points are obtained from the first half (f×T) pieces of data and the subsequent (f×T) pieces of data, and the autocorrelation value may be calculated.

As an example, as sample data corresponding to four pattern pairs, 4×(2×f×T) continuous pieces of sample data are read from an arbitrary position of the sample buffer 33.

The autocorrelation value in each set of samples is calculated by Expression (1).

$$\sum_{n=0}^{fT-1} S(n)\overline{S}(n+fT) \quad (1)$$

$\overline{S}$: Complex conjugate

In this expression, overlined S is a complex conjugate of a sample S. n is the n-th data in a set of (f×T) samples and is an integer from 0 to (f×T−1).

For each set of (f×T) samples, based on Expression (1), the autocorrelation value with the next continuous set of (f×T) samples is calculated and the sum of the obtained autocorrelation values is obtained. The sum may be obtained by adding the autocorrelation values after calculating the autocorrelation values for all sets of samples, or by sequentially adding the autocorrelation values calculated for each set of samples.

When (f×T) pieces of sample data are selected at the end of a pattern pair, the autocorrelation value of the set of samples is maximum. When the buffer selection position coincides with the head position of the training sequence TS, the sum of the autocorrelation values is maximum.

In example A of the correlation operation result, the selection start position of the sample buffer 33 is ahead of the buffer position where the training sequence TS is stored, and the autocorrelation values of three pattern pairs are calculated.

In example B, the buffer selection position is closer to the start position of the training sequence TS than in example A, but autocorrelation operation between different patterns is performed.

In example C, autocorrelation between paired patterns is obtained in all four sets of samples.

In examples D, E, and F, the buffer selection position starts in the middle of the training sequence TS, and the number of obtained autocorrelation results decreases. In example D and example F, autocorrelation is calculated between different patterns.

In the correlation calculation result obtained by the sum of autocorrelation values, the maximum peak is obtained in example C, and the buffer selection start position at this time is determined as the start position of the training sequence. In example A and example E, autocorrelation between paired patterns is obtained, but since the number of autocorrelation values is small, the peak of the sum is smaller than that in example C. In examples B, D, and F, since autocorrelation values between different patterns are calculated, the sum is minimum.

Even when fractional sampling is performed, since the symbol length T is adjusted in advance so that f×T is an integer, autocorrelation values may be correctly calculated using Expression (1).

Once the start position of the training sequence TS in the sample buffer 33 is known, the position of the training sequence TS in the data is known since the length of the training sequence TS is known. Since the length of a data block or the length of a frame including a training sequence and the data block is known, when the position of one training sequence TS is known, the positions of the second and subsequent training sequences TS are also known.

The coefficient calculation unit 35 estimates the characteristic of a transmission line based on the specified training sequence TS and the known training sequence, and sets an initial value of a tap coefficient of the AEQ filter 31. For example, channel estimation is performed by the MMSE method or the like that minimizes a square error, and a coefficient initial value representing the reverse characteristic of the transfer function of the transmission line is calculated.

In this way, even when fractional sampling is performed, an insertion position of the training sequence TS may be correctly specified based on correlation operation, and an appropriate tap coefficient initial value may be set in the adaptive equalizer 30. As a result, the circuit scale and power consumption of the adaptive equalizer 30 may be reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adaptive equalizer comprising:
   a sample buffer that temporarily stores data obtained by fractional sampling at a sampling rate that is larger than one time and smaller than two times a symbol rate; and
   a processor coupled to the sample buffer and configured to:
   specify position of a training sequence in the data based on a correlation value between a first set of (f×T) samples and a second set of (f×T) samples following the first set of samples, assuming that the sampling rate is f, and a symbol length of a code pattern included in the training sequence inserted in the data is T, and
   calculate an initial value of a tap coefficient set to a tap of an adaptive equalization filter based on the specified training sequence,
   the symbol length is changed to a value in which f×T becomes an integer when (f×T) is not the integer.

2. The adaptive equalizer according to claim 1, wherein the processor is configured to:
   read sample data in a predetermined range while shifting a selection position of the sample buffer by one sample at a time, and
   determine a buffer selection position in which a correlation value between the first set of samples and the second set of samples is a maximum, as a start position of the training sequence.

3. The adaptive equalizer according to claim 1, wherein each pattern pair of the training sequence has two identical code patterns, and different pattern pairs have different code patterns.

4. An optical receiver comprising:
   an optical-to-electrical conversion circuit that converts an optical signal received from an optical transmission line into an analog electrical signal;
   an analog-to-digital converter that performs fractional sampling of the analog electrical signal at the sampling rate; and
   the adaptive equalizer according to claim 1, wherein the adaptive equalizer applies adaptive equalization to data subjected to the fractional sampling.

5. The optical receiver according to claim 4, further comprising:
   a memory that stores correspondence information describing a combination of the sampling rate and the symbol length that makes the f×T an integer,
   wherein
   the optical receiver receives the training sequence including a pattern having a symbol length corresponding to the sampling rate of the analog-to-digital converter.

6. The optical receiver according to claim 4, wherein the optical receiver receives, from a network, a value of a symbol length corresponding to the sampling rate of the analog-to-digital converter.

7. The adaptive equalizer according to claim 1, wherein the value is set within a range in which an influence on a data transmission amount is minimized.

8. An optical transmission system, comprising:
   an optical transmitter; and
   an optical receiver,
   the optical transmitter transmits an optical signal in which a training sequence including m (m is a natural number) pattern pairs is inserted into data, and the pattern pair includes two identical code patterns having a symbol length T,
   wherein the optical receiver detects the optical signal received from an optical transmission line to perform digital sampling at a sampling rate f that is greater than one time and smaller than two times a symbol rate, and
   wherein the symbol length T is changed to a value in which the product (f×T) of the sampling rate f and the symbol length T becomes an integer when (f×T) is not the integer.

9. The optical transmission system according to claim 8, further
   a network management device comprising coupled to the optical transmitter and the optical receiver,
   wherein the symbol length T is set by the network management device such that the product (f×T) is an integer in accordance with the sampling rate f of the optical transmitter.

10. The optical transmission system according to claim 8, wherein
    the optical receiver includes correspondence information that describes a combination of the sampling rate f and the symbol length T, and
    the symbol length T according to the sampling rate f is selected, and the selected symbol length T is notified to the optical transmitter.

11. The optical transmission system according to claim 8, wherein the value is set within a range in which an influence on a data transmission amount is minimized.

* * * * *